(12) United States Patent
Goldfarb et al.

(10) Patent No.: US 6,306,470 B1
(45) Date of Patent: *Oct. 23, 2001

(54) ACTIVITY APPARATUS AND METHOD FOR GENERALLY INSTANTANEOUSLY CREATING LITHOPHANE-TYPE PICTORIAL WORKS COMPRISING TRANSLUCENT MATERIAL WITHIN CONTAINERS HAVING A TRANSPARENT SEE-THROUGH WALL

(76) Inventors: Adolph E. Goldfarb, 1432 Eastwind Cir., Westlake Village, CA (US) 91361; Martin I. Goldfarb, 1508 Berkeley St., #F, Santa Monica, CA (US) 90404

(*) Notice: Subject to any disclaimer, the term of this patent is extended or adjusted under 35 U.S.C. 154(b) by 0 days.

This patent is subject to a terminal disclaimer.

(21) Appl. No.: 09/312,079

(22) Filed: May 15, 1999

(51) Int. Cl.$^7$ .................................................. B44F 1/06
(52) U.S. Cl. .............................. 428/14; 428/7; 428/34.1; 428/35.7
(58) Field of Search .................................. 428/34.1, 35.2, 428/7–11, 14; 425/DIG. 57

(56) References Cited

U.S. PATENT DOCUMENTS

| | | | |
|---|---|---|---|
| 3,709,786 | * | 1/1973 | Brody ....................................... 428/14 |
| 3,891,179 | * | 6/1975 | Berman .................................. 249/134 |
| 4,414,731 | * | 11/1983 | Riemer .................................... 29/453 |
| 4,952,462 | * | 8/1990 | Bright .................................. 428/542.2 |
| 5,226,538 | * | 7/1993 | Roselle ............................... 206/459.1 |
| 5,227,205 | * | 7/1993 | Dubrow et al. ........................ 428/13 |
| 5,269,977 | * | 12/1993 | Nakahashi et al. .................... 264/1.9 |
| 5,571,598 | * | 11/1996 | Butler et al. .......................... 428/156 |
| 5,787,508 | * | 8/1998 | Gattamorta ............................... 2/206 |
| 5,925,426 | * | 7/1999 | Galerneau ........................... 428/34.1 |

* cited by examiner

Primary Examiner—Rena L. Dye
(74) Attorney, Agent, or Firm—Ashen & Lippman

(57) ABSTRACT

Activity or craft apparatus and method for simply, quickly and inexpensively creating a thin lithophane-like pictorial work that provides a picture or image when light passes through the work from the rear. The work is formed from a formable translucent material. One form of illustrated apparatus comprises a generally closed container having a transparent see-through front wall. On the rearwardly inwardly facing side of the wall it has a contoured forming surface that is the reverse image of a desired contoured recessed picture-providing surface of a desired lithophane-type work. The illustrated container also has a second or rear wall that is generally parallel to and closely spaced from the front wall. The rear wall is translucent or transparent so that the light can pass through it from the rear. When the container is generally filled with translucent formable material, the material is thereby formed into a thin panel having, at is forward face where it meets and interfaces with the forming surface, the desired picture providing recessed front surface. Light passing from the rear through the translucent panel and transparent front wall, illuminates the lithophane-type picture. The translucent material occupying the container could be liquid, gas, powder, etc. as well as a formable solid material.

6 Claims, 3 Drawing Sheets

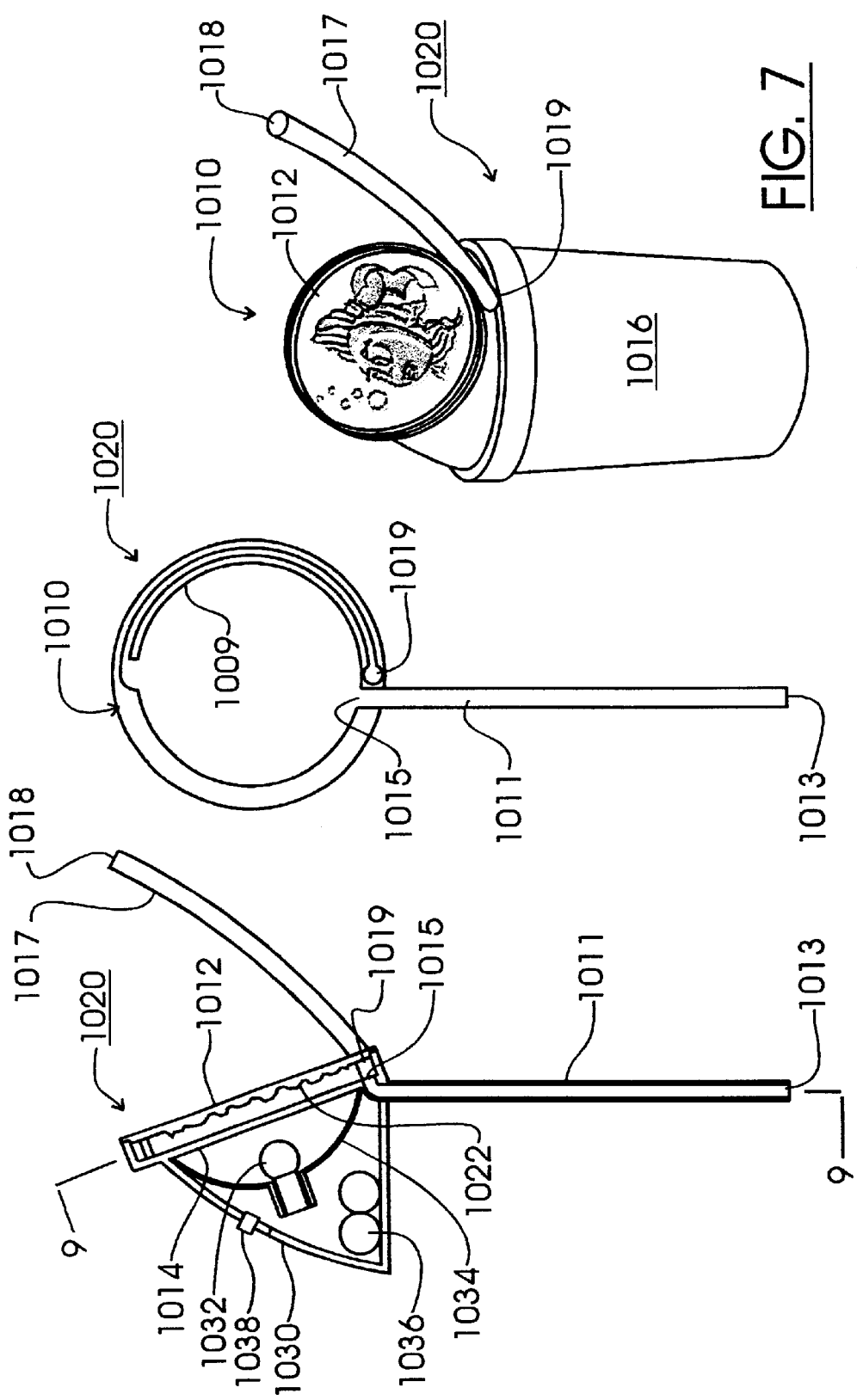

ACTIVITY APPARATUS AND METHOD FOR GENERALLY INSTANTANEOUSLY CREATING LITHOPHANE-TYPE PICTORIAL WORKS COMPRISING TRANSLUCENT MATERIAL WITHIN CONTAINERS HAVING A TRANSPARENT SEE-THROUGH WALL

FIELD OF INVENTION

Activity or craft formation generally instantaneously of lithophane-type pictorial works or objects comprised of translucent material within containers having a transparent see-through wall.

BACKGROUND OF THE INVENTION

Traditional lithophane pictorial works, often in the form of panels that can be hung in windows or in front of a light source, have been made of porcelain. Such a porcelain lithophane work is thin, translucent and has varying thickness such that, when viewed from the front while light passes through the work from the rear, a picture of extreme beauty and delicacy is provided. More particularly, the different thicknesses provide different shades of lightness and darkness. The thicker an area the darker that area will appear. The thinner an area the lighter that area will appear. The variation can go from very dark to very light. Changes can be sudden and dramatic or very gradual and subtle. Each such work has a contoured recessed front picture-providing surface that provides the varying thickness and thus the picture for that work.

To provide a porcelain lithophane work, initially a soft pattern is hand sculpted or carved by a craftsman/artist working with molding material such as wax. The wax is back-lighted so that the progress of the picture can be observed as the contour of the recessed front surface of the wax pattern is sculpted.

Then the wax pattern is used to create a plaster mold with a cavity with a contoured convex surface that is the reverse of the sculpted recessed front surface of the pattern. The plaster mold in turn is used to mold reproductions of the pattern, with each reproduction having the desired contoured recessed front surface. Initially an opaque slick or flowable slurry of porcelain-forming material is introduced into the plaster mold. The slurry must remain in the mold for a prolonged drying period, during which moisture from the slurry passes into the plaster mold. Finally the dried reproduction is removed from the mold and fired or baked in a high temperature oven to produce the final translucent picture-providing porcelain lithophane work. The resulting porcelain lithophane work is beautiful and valuable. However, it's creation is costly, time consuming and requires great skill.

It would be highly desirable to be able to create lithophane-type pictorial works or objects in a simple, quick and inexpensive manner.

It would be especially desirable to be able to control and limit the creating apparatus and process so that it can be used by those of low skill level and/or dexterity, such as young children. In this regard, the more that can be done by the children, without any or with very limited supervision, the more rewarding and exciting it will be for the children.

Similarly, because of children's short attention spans, it is highly desirable that they can see the results of their efforts just as quickly as possible and without extended delays as would be required to dry and/or fire the objects to complete them.

SUMMARY OF THE DISCLOSURE

FIGS. 1 and 2 are schematic representations of a prior art lithophane panel of porcelain. The porcelain which is translucent is formed at its front surface so as to present a viewable picture when light is shown through the panel. The panel front surface is formed with gradients of depth or thickness so that when light is shown through, the thinner portions appear lighter and the thicker portions appear darker. FIG. 2 is a cross section of a portion of the lithophane panel representing the variations in thickness at the front surface S that faces the observer. Light passes through the translucent panel from the opposite rear surface R.

As also noted above, the lithophane process is expensive and time consuming and requires substantial skill.

The illustrated apparatus and method provide a simple, inexpensive and quick way to produce lithophane-type pictorial works comprised of formable translucent material within containers with a transparent see-through wall, all in a manner so simple and undemanding that it can be done by a small child. The result is immediately observable by the user. No drying or firing is required to achieve the finished work.

In a presently preferred embodiment, a lithophane-type pictorial work may be formed within a thin, generally closed container. The illustrated container has a pair of generally parallel closely spaced-apart walls, one front wall and one rear wall. The front wall is transparent and has a contoured forming surface on its inward face. This forming surface is the reverse or mirror-image of a desired contoured recessed picture-providing front surface of a desired lithophane-type pictorial work. When the container is generally filled with a translucent material, the desired lithophane-type work is thereby created within the container. This work is thin and has the desired contoured recessed picture-providing front face where the material meets and interfaces with the forming surface. The opposite or rear container wall is translucent or transparent so that light can pass through the work. The picture provided by the work is then visible through the transparent front wall.

The container could be openable for receiving the material into the container.

In another preferred embodiment, the translucent material could be flowable, and introduced into the container through an entrance. The translucent material could be a soft flowable solid such as "Play Doh" that is forced into the container. The translucent material also could be a liquid, a powder, a granular mix or even a gas. Further, the work need not, at any given instant, be a static body of material, but could be provided by a generally continuous flow of material, such as a liquid or gas, through the container. While the composition of this "work" is continuously changing, its shape or configuration as defined by the interior of the container, and particularly the contoured forward face, remain constant to provide the desired lithophane picture.

BRIEF DESCRIPTION OF THE DRAWINGS

FIG. 7 is a schematic perspective view of another preferred embodiment of apparatus utilizing a liquid as the translucent material.

FIG. 8 is an enlarged schematic side sectional view of the apparatus of FIG. 7.

FIG. 9 is a schematic front sectional view taken generally along Line 9—9 of FIG. 8.

DETAILED DESCRIPTION OF THE DRAWINGS

Figure 2:
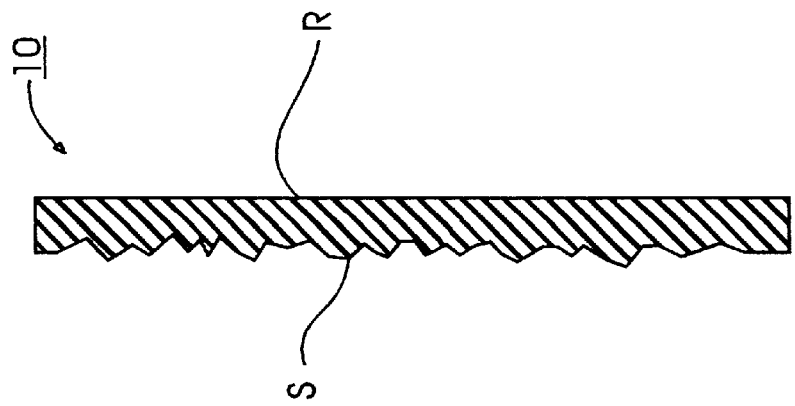
FIG. 2 is an enlarged cross sectional view of the panel of FIG. 1.
Figure 1:
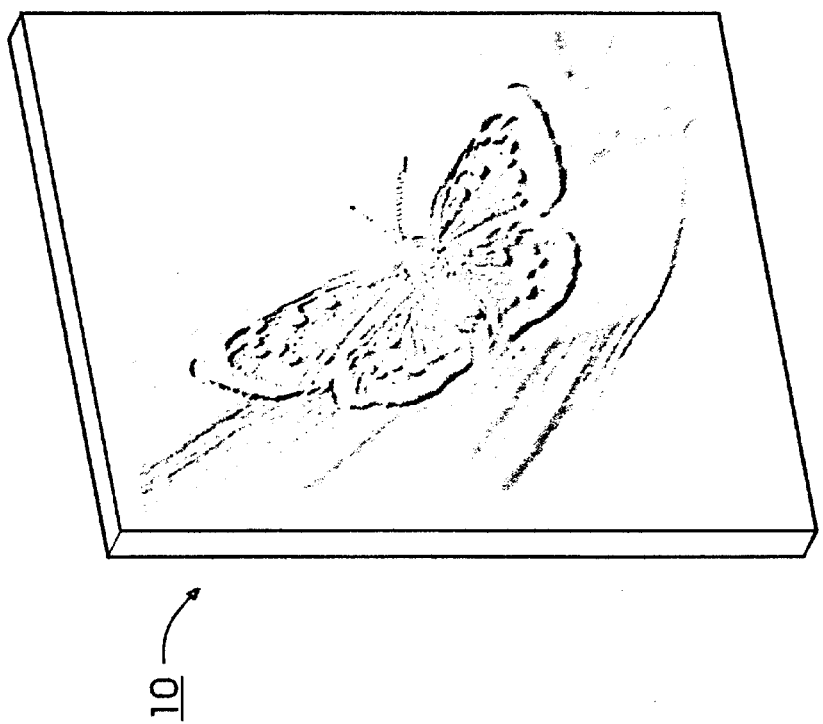
FIG. 1 is a perspective view of a prior art lithophane panel.

As noted above, FIGS. 1 and 2 schematically illustrate a prior art lithophane porcelain work 10. FIG. 1 shows the lithophane pane and the picture or image it presents. FIG. 2 schematically shows the variations in thickness of the pane that produce the variations in light and dark that form that picture or image.

Figure 3:
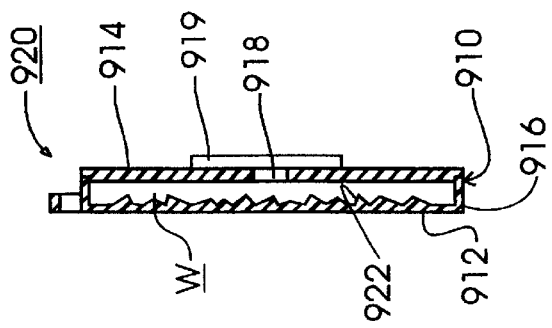
FIG. 3 is a schematic side sectional view of another preferred embodiment of apparatus.
Figure 4:
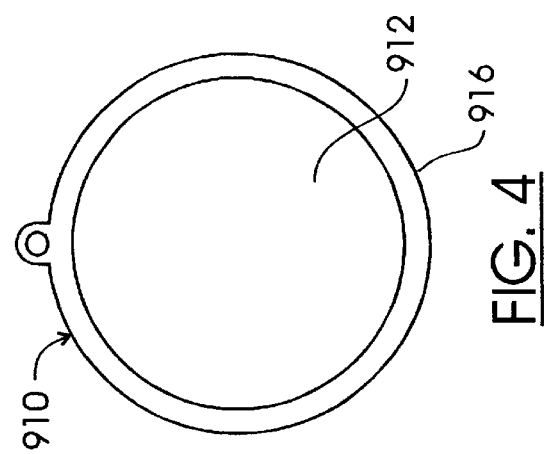
FIG. 4 is a top plan view of the apparatus of FIG. 3.
Figure 5:
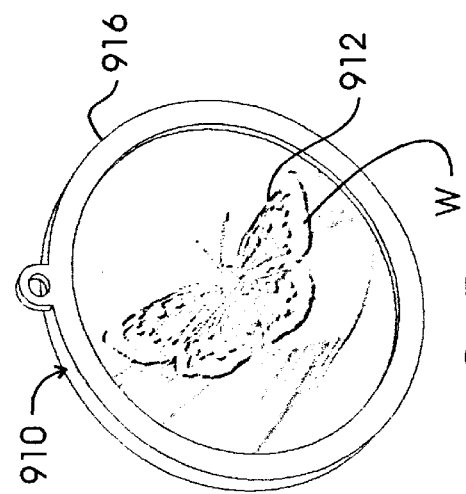
FIG. 5 is a perspective view of the apparatus of FIGS. 3–4.

FIGS. 3 through 5 illustrate a presently preferred apparatus 920 that embodies the present invention. Illustrated apparatus 920 comprises a generally disk-shaped, generally closed container 910 that has a pair of generally circular opposed walls 912, 914. The walls 912, 914 are connected together by a circular side wall 916. One of the walls 912 is transparent and has a contoured lithophane-forming surface 922 on its inside face. The surface 922 is the reverse of mirror image of the contoured recessed picture-providing front surface of a desired lithophane-type pictorial work. The opposite wall 914 is translucent or transparent to allow light to pass through it.

When the container 910 is filled with a translucent material and the material is thereby formed into a lithophane-type pictorial work W, the picture formed by the work W is visible through the transparent wall 912 as illustrated in FIG. 19.

A closable entrance into the container 910 may be provided as by means of an opening 918 through the wall 914 (FIG. 3). After the container 910 is filled with the material, the opening 918 may be closed as with a piece of suitable translucent or transparent tape 919. This seals off the container to keep that material within it and to protect the material from drying out, etc.

Figure 6:
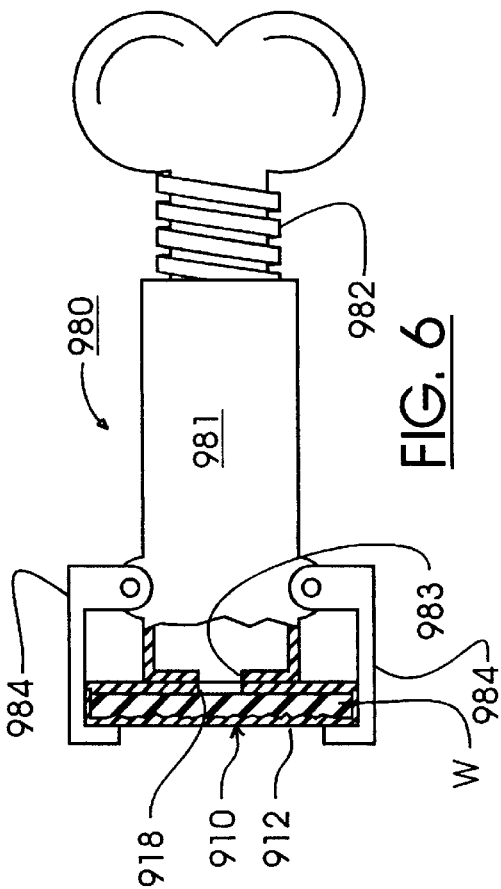
FIG. 6 is a schematic side sectional view of a pump mechanism for use with the apparatus of FIGS. 3–5.

FIG. 6 schematically illustrates a simple pump mechanism 980 for forcing a flowable material such as "Play Doh" into the container 910, through opening 918. The illustrated pump 980 includes a cylinder 981 with a screw mounted plunger 982 that advances when it is rotated. There is an outlet nozzle 983 at one end of the cylinder. The container 910 may be releasibly held by a pair of rotatable mounted clamp arms 984 with the container entrance 918 aligned with the nozzle 983. Thus, translucent flowable material placed in the cylinder 981 may be forced into the container 910 to form the lithophane-type pictorial work W.

Various other flowable translucent materials may be used with apparatus 920. Since the container 910 may be closed after it is filled, flowable material such as a liquid, a gas, a powder or a granular form of material can be used.

FIGS. 7–9 illustrate another presently preferred form of apparatus 1020 embodying the invention. Apparatus 1020 includes a container 1010 which is similar to container 910. Container 1010 has a pair of closely spaced-apart opposed walls 1012, 1014. One wall 1012 is transparent and has a lithophane-forming contoured convex surface 1022 on its inside face. The other wall 1014 is translucent or transparent to allow light to pass through it. The illustrated walls 1012, 1014 are generally circular. The container 1010 is mounted on the upper end of a first tube or straw section 1011. The tube section 1011 is open at its lower end 1013 and connected to and in fluid communication at its upper end 1015 to the interior of the container 1010. A second tube or straw section 1017 is also connected to and in fluid communication at its inner end 1019 with the interior of the container 1010. As shown in FIG. 9, an inner wall 1009 separates the area of the container 1020 where liquid enters the container (at tube end 1015) from where liquid leaves the container (at tube end 1019). This ensures that the flowing liquid fully occupies the container. The outer end 1018 of the second tube section 1017 is open as shown in FIG. 21. When the first tube section 1011 is immersed in a body of translucent liquid such as a glass of milk 1016, and the user sucks on the open end 1018 of the second tube section 1019, milk is drawn into and occupies the container 1010. This volume of translucent liquid, i.e., milk, in the container 1010 at any given time, provides a lithophane-type pictorial work W. It will be appreciated that the milk in the container 1010 is not static but is flowing. The milk in the container 1010 is continuously being replaced by new milk, but at any given instant, milk occupies the interior of the container and interfaces with the forming surface 1022 to provide the thin translucent lithophane-type work W. The pictorial work W appears by magic when the container 1010 becomes filled and disappears just as magically when the container is no longer filled.

To ensure adequate light at the rear of the lithophane-type pictorial work W, as shown in FIG. 8, apparatus may include a rear compartment 1030 in which a light bulb 1032 and a reflector 1034 are mounted. The compartment 1030 may house batteries 1036 to power the light bulb 1032 and an on/off switch 1038.

As noted above, other materials or substances may be used. For example a translucent gas could be caused to occupy a container with a wall having a lithophane-forming contoured surface like surface 1011. Similarly, a translucent powder or other granular material could be used, although fineness of detail would be lost with larger size granules.

Various modifications may be made in the illustrated apparatus and method without departing from the spirit and cope of the invention as set forth in the following claims.

What is claimed is:

1. A composite product which incorporates a lithophane pictorial work, said product comprising:

a) a generally closed container having a pair of generally parallel, closely spaced apart walls, a front one of said walls being transparent and having a contoured forming surface on its inward face, said forming surface being a reverse image of a contoured recessed picture-providing front surface of a desired lithophane pictorial work, the rear of said walls being transparent or translucent to allow light to pass through, and b) a body of flowable translucent material substantially filling said container so that the material generally assumes the shape of the interior of the container and forms a thin translucent panel having a contoured recessed picture-providing front surface at the interface with said forming surface, whereby a lithophane picture is viewable through of said transparent front wall when light is passed through said container from the rear.

2. The composite product of claim 1 wherein said container has a closable entrance for passage of the translucent material into said container.

3. The composite product of claim 1 wherein said container has an entrance for receipt of the material in fluid form into said container and an exit for discharge of the fluid material from said container.

4. The composite product of claim 3 further including means to provide a flow of fluid material to said entrance.

5. A composite product which incorporates a lithophane pictorial work, said product comprising:
   a) a transparent front viewing wall having a contoured convex rear forming surface, said forming surface being a reverse image of a contoured recessed picture-providing front surface of a desired lithophane pictorial work, and
   b) a body of formable translucent material disposed at the rear of said wall as a thin translucent panel having a contoured recessed picture-providing front surface at the interface with said rear forming surface, whereby a lithophane picture is viewable through said transparent wall when light is passed through said panel from the rear.

6. The composite product of claim 5 further including a rearwardly extending boundary wall generally surrounding said forming surface.

* * * * *